Jan. 6, 1953  P. G. SMITH  2,624,227
MUSICAL PEGBOARD
Filed July 28, 1949

INVENTOR.
P. G. SMITH
BY
Merrill M. Blackburn
ATTORNEY

Patented Jan. 6, 1953

2,624,227

UNITED STATES PATENT OFFICE 2,624,227

MUSICAL PEGBOARD

Paul G. Smith, Rock Island, Ill.

Application July 28, 1949, Serial No. 107,213

1 Claim. (Cl. 84—471)

The present invention relates to the art of educational devices for use in the teaching of music. The teaching of scales and chords is in general purely a matter of the teaching by rote of scale and chord progressions in each of the various keys.

As the pupil moves from key to key, there is a succession of sharps and flats. To the beginner, there is little appearance of logic, sense, or system in the whole subject of that which is termed "theory" but which appears to him to be only "confusion."

It is believed that the fundamental difficulty in the whole matter which beginners encounter is that the positioning of notes on the staff and the letter names employed are based upon one key only, namely, the key of C. In that key, the major scale progresses upwardly with no exceptional positioning of the notes on the staff. As soon as departure is made from this key, irregularities enter. This progresses in the addition of sharps up to the key of C-sharp in which there are seven sharps, and in which it has reached the apparently absurd situation that C must then become C-sharp. To complete the confusion of the pupil, he is instructed that there is a full tone difference between A and B but only half a tone between B and C. In despair of understanding, the pupil proceeds to learn his scales and chords by rote and just stops worrying about why two major triads sound much the same. As generally happens, the pupil regards the subject as quite difficult and he either turns completely away from learning the theory of music or he regards both his teacher and himself as something rather special, since his teacher has learned the subject and he is now learning it.

The present invention is based upon the fundamental simplicity of the standard diatonic scale, and that like progressions have the same progression pattern, starting at any pitch. The only complexity then is in the naming system of the notes and in their lack of accurate graphic representation upon the staff. However, this comes readily once the real simplicity of the entire organization is realized, and such is the real purpose, for the pupil, of this invention. This greatly simplifies the accurate reading of music for instruments.

In the accompanying drawings, preferred forms of the present invention are illustrated, in which.

Figure 1:
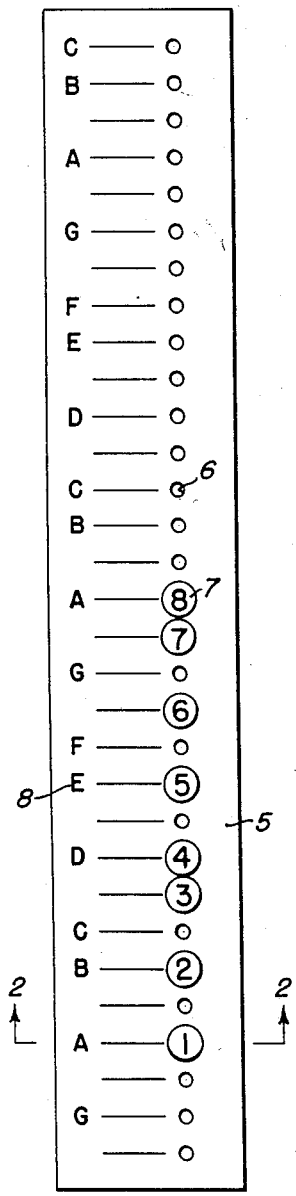
Fig. 1 is a plan view of a preferred form of the present invention.
Figure 2:
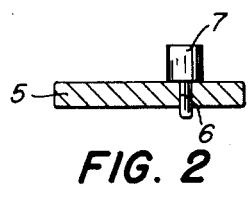
Fig. 2 is a section along the plane indicated by the line 2—2 of Fig. 1.

The educational device shown in Fig. 1 is constituted of a sheet material strip 5. A series of holes 6 extend into the strip 5. The holes 6 are equally spaced in the series. A plurality of pegs 7 are provided for insertion into any of the holes 6. Various indications may be placed on the faces of the pegs, such as the fingering for instruments and syllables instead of numbers.

The spacing between adjacent holes of any of the series of holes 6 represents one-half tone in each instance. Indicia 8 are provided adjacent the holes representing all natural notes. This results in adjacent holes representing the pairs "B—C" and "E—F," while all other adjacent natural notes have two spaces therebetween.

Inspection of the board will therefore show that the scale of the key of C progresses with two full tones, one half tone, three full tones, and one half tone. This is quite distinct from the visual impression gained by an inspection of this scale on the staff. There it appears that the scale of the key of C progresses without distinction of the tonal intervals.

In Fig. 1, the board is shown with the pegs in place for the scale of the key of A. It is obvious that, although the scale is at a different pitch, the tonal intervals are the same as for the key of C. In similar fashion, by putting the pegs in appropriate positions, other scales and chords may be represented and studied.

In the form shown, only the natural tones have been designated with indicia. If desired, indicia indicating sharps and flats may be employed. However, these can be so readily interpolated that the use of such indicia has been found unnecessary.

Figure 4:
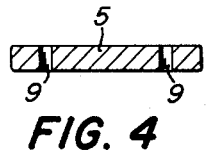
Fig. 4 is a section along the plane indicated by the line 4—4 of Fig. 3.
Figure 3:
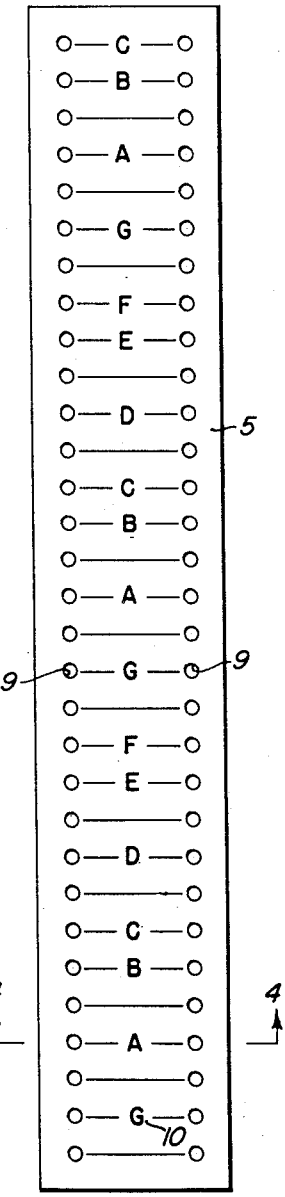
Fig. 3 is a plan view of an alternate form of the present invention.

In the form shown in Figs. 3 and 4, a pair of rows of holes 9 is provided, with the spacing the same as in Fig. 1 and with the holes of one row opposite the holes in the other. Indicia 10 indicating the natural tones are provided and positioned, as described in connection with Fig. 1. There is thus illustrated a double note indication simultaneously. This is of particular advantage in chord and scale comparison and also in the study of minor keys in which the notes ascending differ from those descending. Different scales may be set on each side of the board for contrasting the differences in tonal spacing. In the form shown in Figs. 3 and 4, illustrating the use of a plurality of rows of holes 6, this is intended to be illustrative of the use of any desired number of rows of holes.

The basis for the different modes and scales is fundamentally the different patterns of whole and half-steps, as shown in scale-wise progression. These are numerous, as will be seen by analyses of, for example, the major mode, the natural minor mode, the harmonic minor mode, melodic minor mode, and the several Ecclesiastical modes, as well as the chromatic and whole-toned scales. Any of these several invariable patterns may readily be illustrated visually on the device of the present invention, because, for each scale, or the like, the pattern thereof is intrinsically invariable.

If desired, fingering for brass, wood wind, or string instruments may, to advantage, be included, by means of markings on the pegs placed in the holes on one side of the board to correspond to a scale set-up on the other.

While the positioning of the indicators has been shown as holes in the board and the indicators as pegs, it is entirely obvious that other means may be employed to removably hold suitable indicators in the predetermined positions. As an alternative for the pegs, spring clips may be provided which can be constructed to be clipped to the edge of the board.

It is preferred that the board be at least two octaves long. On such a board, all the scales and principal chords can be studied. By making the board two octaves and a fifth (a musical fifth) the extended chords may likewise be studied. Varying lengths may be convenient to the range of various instruments.

In this specification, the term "board" is used in a broad or generic sense and not as referring to any specific material, as any suitable material, such as wood, cardboard, leather, metal, plastic, et cetera, may be used without departing from the scope of the appended claim.

It is of course understood that the specific description of structure set forth above may be departed from without departing from the spirit of this invention as disclosed in this specification and as defined in the appended claim.

Having now described my invention, I claim:

An educational device for use in teaching music and in illustrating visually the pitch relationships between the various tones making up any selected scale and the relationships between various scale patterns, said device comprising an elongated rectangular panel, said panel having a row of equally spaced-apart lines positioned substantially centrally of the panel and extending approximately longitudinally thereof, said lines terminating short of the adjacent edge of the panel leaving a space between one end of the line and said adjacent panel edge, said lines representing a series of ascending half-steps extending substantially for two octaves, certain of said lines bearing the names of the notes on the staff and placed, respectively, opposite the lines representing the corresponding fixed tones of the staff, said device having a hole directly adjacent each of said half-step lines of both scales, each hole being perpendicular to the plane of the panel and positioned in the space between said edge of the panel and the adjacent end of the associated half-step line, and a plurality of eight pegs insertable in said holes in a direction normal to the plane of the panel, and each peg having an enlarged head bearing indicia, such as the numbers 1 through 8, representing, respectively, the tones of a scale, said indicia being substantially as large as said names of the notes on the staff and facing in the same direction to facilitate visual perception of both at substantially the same time, said pegs being adapted to be inserted in selected holes to represent, visually, any selected scale pattern in any selected key, each peg, upon being required in the selected pattern, being shiftable to any adjacent hole to illustrate, visually, the relation between said particular scale pattern and a related scale pattern.

PAUL G. SMITH.

REFERENCES CITED

The following references are of record in the file of this patent:

UNITED STATES PATENTS

| Number | Name | Date |
|---|---|---|
| 203,210 | Stauffer | Apr. 30, 1878 |
| 605,144 | Springhorn | June 7, 1898 |
| 657,953 | McLaren | Sept. 18, 1900 |
| 666,247 | Fraisher | Jan. 15, 1901 |
| 1,353,486 | McOuat | Sept. 21, 1920 |
| 1,412,587 | Willoughby | Apr. 11, 1922 |
| 1,600,052 | McAleavey | Sept. 14, 1926 |
| 1,721,282 | Rosenberg | July 16, 1929 |